United States Patent
Watabe

(10) Patent No.: US 12,307,585 B2
(45) Date of Patent: May 20, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hiroki Watabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 18/330,441

(22) Filed: Jun. 7, 2023

(65) Prior Publication Data
US 2023/0410418 A1 Dec. 21, 2023

(30) Foreign Application Priority Data
Jun. 16, 2022 (JP) ................................. 2022-097342

(51) Int. Cl.
*G06T 15/80* (2011.01)
*G02B 27/01* (2006.01)
(Continued)

(52) U.S. Cl.
CPC .......... *G06T 15/80* (2013.01); *G02B 27/0172* (2013.01); *G06T 5/50* (2013.01);
(Continued)

(58) Field of Classification Search
CPC .. G06T 15/80; G06T 5/50; G06T 7/50; G06T 7/90; G06T 2207/10024; G06T 2207/20221; G06T 11/00; G06T 15/506; G06T 19/006; G02B 27/0172; G06V 10/761
See application file for complete search history.

(56) References Cited

U.S. PATENT DOCUMENTS 9,497,380 B1 * 11/2016 Jannard ................. H04N 23/90
10,589,172 B1 * 3/2020 Nash ....................... A63F 13/53
(Continued)

FOREIGN PATENT DOCUMENTS

JP 2020-067820 A 4/2020

OTHER PUBLICATIONS

Seitz Jr, K. A., Foley, T., Porumbescu, S. D., & Owens, J. D. (2019). Staged metaprogramming for shader system development. ACM Transactions on Graphics (TOG), 38(6), 1-15.*

*Primary Examiner* — Sarah Lhymn
(74) *Attorney, Agent, or Firm* — Venable LLP

(57) ABSTRACT

An image processing apparatus obtains data of a captured image, generates computer graphics corresponding to an appearance of a virtual object disposed in a virtual space from a virtual viewpoint, and generates a moving image by superimposing the computer graphics on the captured image. Generation information to be used in the case of generating a still image is outputted at time of acceptance of an obtainment request for data of the still image corresponding to a frame of the moving image. The generation information includes the data of the captured image and intermediate data to be generated in the case of generating the computer graphics, which are the data present at the time of acceptance of the obtainment request. The intermediate data is information used in lighting processing in the case of generating the computer graphics.

14 Claims, 11 Drawing Sheets

(51) Int. Cl.
*G06T 5/50* (2006.01)
*G06T 7/50* (2017.01)
*G06T 7/90* (2017.01)
*G06V 10/74* (2022.01)

(52) U.S. Cl.
CPC ................ *G06T 7/50* (2017.01); *G06T 7/90* (2017.01); *G06V 10/761* (2022.01); *G06T 2207/10024* (2013.01); *G06T 2207/20221* (2013.01)

(56) References Cited

U.S. PATENT DOCUMENTS

| | | | |
|---|---|---|---|
| 10,777,010 B1* | 9/2020 | Patel | G06T 15/50 |
| 10,803,665 B1* | 10/2020 | Patel | A63F 13/5255 |
| 10,885,701 B1* | 1/2021 | Patel | A63F 13/57 |
| 2014/0232822 A1* | 8/2014 | Venkataraman | H04N 23/64 |
| | | | 348/43 |
| 2018/0047185 A1* | 2/2018 | Boisson | H04N 23/80 |
| 2019/0075351 A1* | 3/2019 | Hall | H04N 13/161 |
| 2019/0094981 A1* | 3/2019 | Bradski | G06V 40/168 |
| 2020/0132996 A1* | 4/2020 | Yokota | G06F 3/013 |
| 2020/0314445 A1* | 10/2020 | Park | H04N 19/52 |
| 2022/0366615 A1* | 11/2022 | Damghanian | G06T 7/70 |
| 2023/0132473 A1* | 5/2023 | Lee | H04N 13/351 |
| | | | 382/154 |

\* cited by examiner

IMAGE PROCESSING APPARATUS, IMAGE PROCESSING METHOD, AND STORAGE MEDIUM

BACKGROUND

Field

The present disclosure relates to an image processing technique for generating an MR image.

Description of the Related Art

In a case of generating a mixed reality (MR) moving image and displaying the image on a display device, low-quality computer graphics (CG) are generally generated by reducing an amount of calculation in processing to generate the CG to be superimposed on an MR image in order to maintain a real-time capability of the moving image. For this reason, in a case where data of a frame of the MR moving image at that point of time is directly saved as data of an MR still image, the MR still image turns out to be low in quality. Japanese Patent Laid-Open No. 2020-67820 discloses a technique for achieving a real-time capability as a moving image and quality as a still image at the same time by providing a unit configured to generate CG in real time, and another unit being different from the unit configured to generate CG in real time and configured to generate the CG at an arbitrary point of time at high quality.

SUMMARY

An image processing apparatus of the present disclosure includes: one or more hardware processors; and one or more memories storing one or more programs configured to be executed by the one or more hardware processors, the one or more programs including instructions for: obtaining data of a captured image; generating computer graphics corresponding to an appearance of a virtual object disposed in a virtual space from a virtual viewpoint; generating a moving image by superimposing the computer graphics on the captured image; accepting an obtainment request of data of a still image corresponding to a frame of the moving image; and outputting generation information to be used in a case of generating the still image, in which the generation information includes the data of the captured image at time of acceptance of the obtainment request, and intermediate data to be generated in a case of generating the computer graphics, the intermediate data being present at the time of acceptance of the obtainment request, and the intermediate data is information used in lighting processing in the case of generating the computer graphics.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

A large amount of calculation is required in generation processing in order to generate high-quality CG at an arbitrary point of time by using the technique disclosed in Japanese Patent Laid-Open No. 2020-67820. Accordingly, in a case where the technique disclosed in Japanese Patent Laid-Open No. 2020-67820 is applied to generation of an MR image, a large amount of calculation is required in generation processing in order to generate a high-quality MR still image at an arbitrary point of time.

Embodiment 1

Figure 1:
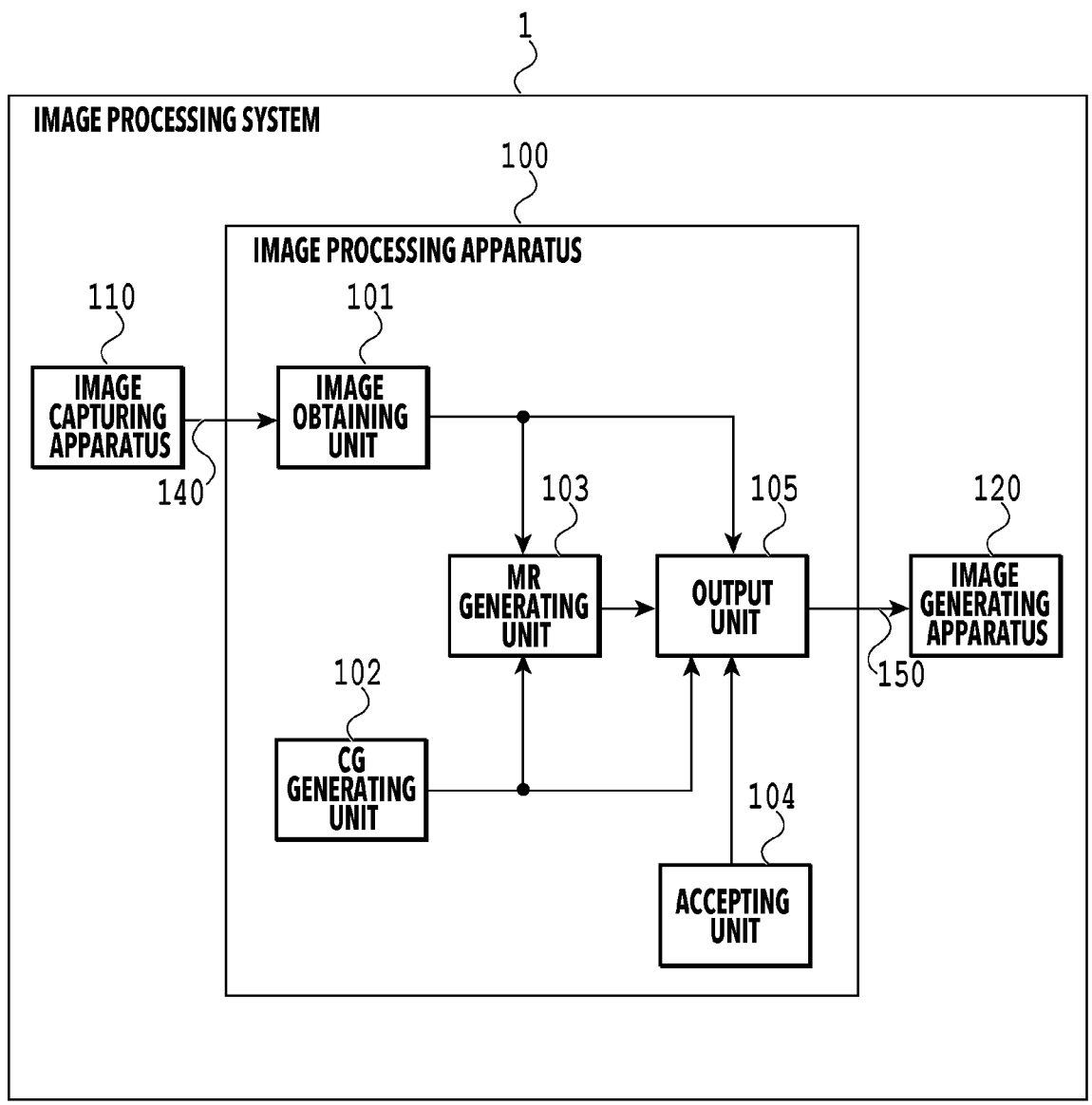
FIG. 1 is a block diagram showing an example of functional structures of an image processing apparatus according to Embodiment 1.

An image processing apparatus 100 according to Embodiment 1 will be described with reference to FIGS. 1 to 9. First, a configuration of the image processing apparatus 100 will be described with reference to FIGS. 1 and 2. FIG. 1 is a block diagram showing an example of functional structures of the image processing apparatus 100 according to the Embodiment 1. As shown in FIG. 1, the image processing apparatus 100 is applied to an image processing system 1. The image processing system 1 includes the image processing apparatus 100, an image capturing apparatus 110, and an image generating apparatus 120.

The image processing apparatus 100 is coupled to the image capturing apparatus 110 through a communication line 140 as typified by an exclusive line and a local area network (LAN) in such a way as to be capable of communicating with each other. Meanwhile, the image processing apparatus 100 is coupled to the image generating apparatus 120 through a communication line 150 as typified by the exclusive line and the LAN in such a way as to be capable of communicating with each other. The image capturing apparatus 110 is formed from a digital still camera, a digital video camera, or the like and is configured to output data (hereinafter also referred to as captured image data) of an image obtained by image capturing (hereinafter referred to as a captured image).

The image processing apparatus 100 obtains the captured image data outputted from the image capturing apparatus 110 through the communication line 140, and generates an image (hereinafter referred to as an MR image) by superimposing computer graphics (hereinafter referred to as CG) on the captured image. Note that the MR image generated by the image processing apparatus 100 is a moving image (hereinafter referred to as an MR moving image). The image processing apparatus 100 causes a display device that is not-illustrated in FIG. 1 to display the generated MR moving image. The image processing apparatus 100 is applied to a head mounted display (HMD), for example. In the case where the image processing apparatus 100 is applied to the HMD, the image capturing apparatus 110 is installed in the HMD and captures images in a direction to which a user mounting the HMD turns the face. Moreover, in this case, the image processing apparatus 100 causes the display device installed in the HMD to display the generated MR moving image.

Meanwhile, the image processing apparatus 100 accepts a request from a user or the like for obtaining data (hereinafter simply referred to as an "obtainment request") of a still image of the MR image (hereinafter referred to as an MR still image) corresponding to a frame of the MR moving image. The image processing apparatus 100 outputs information necessary for generating the MR still image corresponding to the frame in the MR moving image at the time of acceptance of the obtainment request. In the following description, the information necessary for generating the MR still image will be referred to as "generation information". To be more precise, the image processing apparatus 100 outputs captured image data, depth data, and rendering information at the time of acceptance of the obtainment request as well as intermediate data generated in a case of generating the CG collectively as the generation information. The present embodiment is described on the assumption that the image processing apparatus 100 also outputs the depth data at the time of acceptance of the obtainment request as the generation information in addition to the captured image data, the rendering information, and the intermediate data generated in the case of generating the CG. Here, the depth data is data that indicates a depth of a space corresponding to at least part of an image capturing range in the captured image, or in other words, a distance from the image capturing apparatus to an object that is present in the space. Meanwhile, the rendering information is information indicating rendering conditions used in the case of generating the CG. The rendering information at least includes viewpoint information that indicates a position of a viewpoint. The intermediate data is generated in the case of generating the CG and is used in lighting processing in the case of generating the CG, for example. Details of the depth data, the rendering information, and the intermediate data will be described later.

The image generating apparatus 120 obtains the generation information, which is outputted from the image processing apparatus 100, through the communication line 150 and generates the MR still image based on the obtained generation information. To be more precise, the image generating apparatus 120 generates the CG to be superimposed on the captured image by using the intermediate data and the rendering information included in the generation information. Moreover, the image generating apparatus 120 generates the MR still image by superimposing the CG on the captured image by using data of the generated CG and the captured image data as well as the depth data included in the generation information. By generating the CG while using the intermediate data and the rendering information, the image generating apparatus 120 can generate the CG at higher quality than the quality of the aforementioned frame with a smaller amount of calculation. As a consequence, the image generating apparatus 120 can generate the high-quality MR still image with a smaller amount of calculation.

<Configuration of Image Processing Apparatus>

The image processing apparatus 100 includes an image obtaining unit 101, a CG generating unit 102, an MR generating unit 103, an accepting unit 104, and an output unit 105 collectively as functional structures thereof. Processing by the respective units included in the image processing apparatus 100 as the functional structures thereof is carried out by hardware such as an application specific integrated circuit (ASIC) built in the image processing apparatus 100. The processing may be carried out by hardware such as a field programmable gate array (FPGA). Alternatively, the processing by the respective units included in the image processing apparatus 100 as the functional structures may be carried out by software while using a memory such as a random access memory (RAM) and a processor such as a central processing unit (CPU). Details of the processing by the respective units shown in FIG. 1 will be described later.

Figure 2:
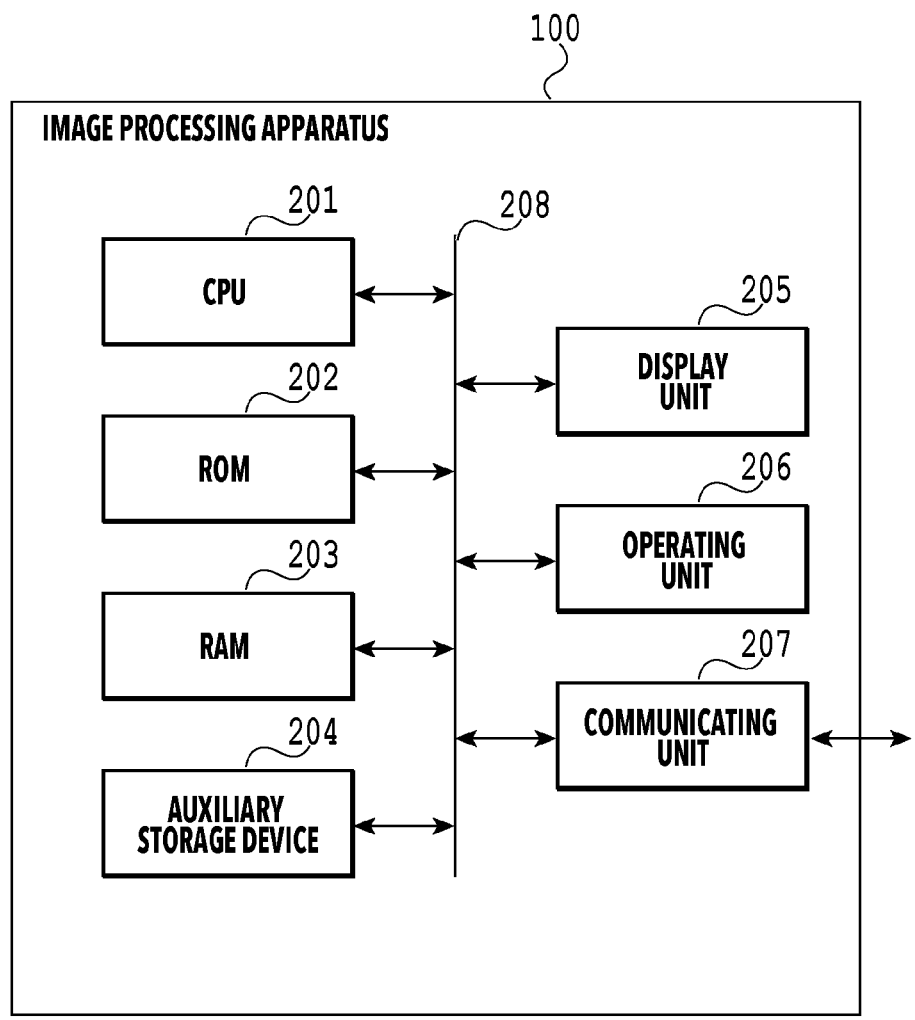
FIG. 2 is a block diagram showing an example of a hardware configuration of the image processing apparatus according to the Embodiment 1.

A hardware configuration of the image processing apparatus 100 in the case where the respective units included as the functional structures in the image processing apparatus 100 are operated as the software will be described with reference to FIG. 2. FIG. 2 is a block diagram showing an example of the hardware configuration of the image processing apparatus 100 according to the Embodiment 1. The image processing apparatus 100 is formed from a computer. As shown as an example in FIG. 2, this computer includes a CPU 201, a ROM 202, a RAM 203, an auxiliary storage device 204, a display unit 205, an operating unit 206, a communicating unit 207, and a bus 208.

The CPU 201 is the processor that controls the computer by using programs or data stored in the ROM 202, the RAM 203, or the like, thereby causing the computer to function as the respective units included in the image processing apparatus 100 as the functional structures as shown in FIG. 1. Here, the image processing apparatus 100 may include one or more dedicated hardware units that are different from the CPU 201, and at least part of the processing to be carried out by the CPU 201 may be executed by the dedicated hardware. Examples of the dedicated hardware include an ASIC, an FPGA, a digital signal processor (DSP), and the like. The ROM 202 is a memory for storing programs and the like that do not require changes. The RAM 203 is a memory for temporarily storing programs or data supplied from the auxiliary storage device 204, or data and the like supplied from outside through the communicating unit 207. The auxiliary storage device 204 is formed from a hard disk drive, for example, and stores the programs or various data such as image data and audio data.

The display unit 205 is formed form a liquid crystal display device or LEDs, for example, and displays a graphic user interface (GUI) for allowing a user to operate the image processing apparatus 100 or to browse a state of the processing in the image processing apparatus 100, and so forth. In the present embodiment, the MR moving image generated by the image processing apparatus 100 is assumed to be displayed on the display unit 205. For example, the operating unit 206 is formed from a keyboard, a mouse, a joystick, a touch panel, or the like, and is configured to accept operations by the user so as to input various instructions to the CPU 201. The CPU 201 is also operated as a display control unit to control the display unit 205 and as an operation control unit to control the operating unit 206.

The communicating unit 207 is used for communication such as transmission and reception of the data and the like between the image processing apparatus 100 and an external device. For example, in a case where the image processing apparatus 100 is coupled by wire to the external device, a cable for communication is coupled to the communicating unit 207. In a case where the image processing apparatus 100 has a function to wirelessly communicate with the external device, the communicating unit 207 is provided with an antenna. In the present embodiment, the image processing apparatus 100 communicates with the image capturing apparatus 110, the image generating apparatus 120, and the like through the communicating unit 207. The bus 208 connects the units provided as the hardware configuration of the image processing apparatus 100 to one another in order to transmit information. While the description will be given in the Embodiment 1 on the assumption that the display unit 205 and the operating unit 206 are incorporated in the image processing apparatus 100, at least one of the display unit 205 and the operating unit 206 may be present as a separate device outside the image processing apparatus 100.

<Processing in Respective Functional Structures of Image Processing Apparatus>

A description will be given of processing of the respective units included in the image processing apparatus 100 as the functional structures thereof. The image obtaining unit 101 obtains the captured image data. To be more precise, the image obtaining unit 101 obtains the captured image data outputted from the image capturing apparatus 110 through the communicating unit 207. The source of obtainment of the captured image data is not limited to the image capturing apparatus 110. The image obtaining unit 101 may obtain the captured image data by reading out the captured image data from a storage device not illustrated in FIG. 1. In this case, the image capturing apparatus 110 outputs the captured image data to the storage device and causes the storage device to store the captured image data in advance, for example.

The image obtaining unit 101 may obtain the depth data in addition to the captured image data. For example, the image obtaining unit 101 obtains depth image data outputted from a depth camera not illustrated in FIG. 1 as the depth data. In this case, the image capturing apparatus 110 and the depth camera are located at positions close to each other. Moreover, a direction of an optical axis of the image capturing apparatus 110 and a direction of an optical axis of the depth camera are preferably the same direction. Note that the expression "the same" stated herein is not limited to a case of being completely identical but also includes a case of being substantially the same.

The depth image data is not limited to the data outputted from the depth camera. In a case where the image capturing apparatus 110 is a stereo camera, for instance, the image obtaining unit 101 may generate and obtain the depth image data by using two pieces of the captured image data outputted from the image capturing apparatus 110, which correspond to a right side and a left side, respectively. A method of generating the depth image data by using the captured image data outputted from the stereo camera has been publicly known and explanations thereof will be omitted. The depth data is not limited to the depth image data but may also be point cloud data. In this case, the image obtaining unit 101 obtains point cloud data outputted from a three-dimensional scanner not illustrated in FIG. 1 using a time-of-flight method of a laser beam and the like as the depth data, for example. In this case, the image capturing apparatus 110 and the three-dimensional scanner are preferably disposed at positions close to each other. In the following description, the image obtaining unit 101 is assumed to obtain the depth data in addition to the captured image data.

The CG generating unit 102 generates the CG by performing rendering based on the rendering information. Here, the rendering information is information that indicates rendering conditions in the case where the CG generating unit 102 generates the CG. To be more precise, the CG generating unit 102 performs the rendering based on the rendering conditions, thereby generating the CG corresponding to an appearance from a virtual viewpoint of a virtual object disposed in a virtual space. The rendering information at least includes information indicating apposition of the virtual viewpoint in the virtual space (this information will be hereinafter referred to as viewpoint information). Details of processing to generate the CG will be described later.

In the case where the CG generating unit 102 generates the CG, the CG generating unit 102 generates the intermediate data in the process of generating the CG. The intermediate data is used in the lighting processing in the case where the CG generating unit 102 generates the CG, for example. Here, the intermediate data includes information indicating a base color (hereinafter referred to as color information), information indicating a normal line (hereinafter referred to as normal line information), information indicating reflection (hereinafter referred to as reflection information), information indicating world coordinates of respective pixels in the CG (hereinafter referred to as CG coordinate information), or the like. The intermediate data includes at least one of the aforementioned kinds of information.

The color information is information that indicates a color or a hue of each of one or more elements constituting the virtual object appearing in the CG. Meanwhile, the normal line information is information that indicates an orientation of each element constituting the virtual object appearing in the CG. In the meantime, the reflection information is information indicating reflection of each element constituting the virtual object appearing in the CG. Meanwhile, the CG coordinate information is information indicating a position in the virtual space corresponding to each pixel in the CG, for example, which is the information expressed by using the same coordinate system as that in an actual space.

To be more precise, in a case where three-dimensional shape data representing the virtual object is expressed by one or more polygons, the color information is the information that indicates the color or the hue of each polygon constituting the virtual object appearing in the CG, for example. Meanwhile, the normal line information in this case is the information that indicates the orientation of each polygon constituting the virtual object appearing in the CG, which is the information indicating a direction of the normal line to each polygon, for example. In the meantime, the reflection information in this case is the information indicating the reflection of each polygon constituting the virtual object appearing in the CG, for example.

The three-dimensional shape data representing the virtual object is not limited to the data expressed by one or more polygons, but may also be data expressed by a point cloud or voxels, for example. In the case where the three-dimensional shape data representing the virtual object is expressed by the point cloud, the color information is the information that indicates the color of each point in the point cloud indicating the virtual object appearing in the CG, for example. Meanwhile, the normal line information in this case is the information that indicates an orientation of a plane surrounded by line segments connecting the points in the point cloud representing the virtual object appearing in the CG to one another, which is the information indicating a direction of the normal line to this plane, for example. In the meantime, the reflection information in this case is the information indicating the reflection of the plane surrounded by the line segments connecting the points in the point cloud representing the virtual object appearing in the CG to one another, for example.

Likewise, in the case where the three-dimensional shape data representing the virtual object is expressed by the voxels, the color information is the information that indicates the color of each voxel representing a surface of the virtual object appearing in the CG, for example. Meanwhile, the normal line information in this case is the information that indicates an orientation of a plane surrounded by line segments connecting the voxels representing the surface of the virtual object appearing in the CG to one another, which is the information indicating a direction of the normal line to this plane, for example. In the meantime, the reflection information in this case is the information indicating the reflection of the plane surrounded by the line segments connecting the voxels representing the surface of the virtual object appearing in the CG to one another, for example. In the following description, the three-dimensional shape data representing the virtual object is assumed to be expressed by one or more polygons.

The MR generating unit 103 generates a frame of the MR moving image by overlapping the CG on the captured image. To be more precise, the MR generating unit 103 generates the frame of the MR moving image by using the captured image data, the depth data, and the CG data. The MR generating unit 103 generates the MR moving image by repeating the operation to generate the frames of the MR moving image. The MR moving image generated by the MR generating unit 103 is outputted to the display unit 205 and displayed on the display unit 205. Here, the MR image generated by the MR generating unit 103 constitutes the moving image. Accordingly, the MR generating unit 103 generates the respective frames of the MR moving image in accordance with a frame rate for display. As a consequence, the CG generating unit 102 generates the CG used in the case of generating the respective frames of the MR moving image in accordance with the frame rate for display. A method of generating the frames of the MR moving image by using the captured image data and the CG data has been publicly known and detailed explanations thereof will be omitted.

The accepting unit 104 accepts the obtainment request by receiving a signal indicating the obtainment request. The signal is outputted from the operating unit 206 as a consequence of an operation of the operating unit 206 by the user, for example. The output unit 105 outputs the generation information to be used in the case of generation of the MR still image corresponding to the frame of the MR moving image at the time of acceptance of the obtainment request. The generation information includes the captured image data to be used for generation of the frame of the MR moving image by the MR generating unit 103 at the time of acceptance of the obtainment request. The generation information also includes the rendering information in the case of generating the CG to be used for generating the frame of the MR moving image at the time of acceptance of the obtainment request. Moreover, the generation information includes the intermediate data to be generated in the case of generating the CG to be used for generating the frame of the MR moving image at the time of acceptance of the obtainment request.

Meanwhile, in addition to the viewpoint information, the output unit 105 may output the generation information that includes the rendering information containing a shader code to be used as a rendering condition at the time of acceptance of the obtainment request. In the meantime, in addition to the viewpoint information, the output unit 105 may output the generation information that includes the rendering information containing information on a position of a light source, a slanting angle of light emitted from the light source, a color of the light, intensity of the light, or the like (hereinafter referred to as light source information). Moreover, in addition to the captured image data, the output unit 105 may output the generation information that includes the depth data used for generation of the frame of the MR moving image at the time of acceptance of the obtainment request. The output unit 105 outputs the generation information to the image generating apparatus 120 through the communication line 150. The output destination of the generation information is not limited to the image generating apparatus 120. The output unit 105 may output the generation information to the auxiliary storage device 204 or a storage device not illustrated in FIG. 1, and may cause such a storage device to store the outputted generation information.

<Configuration of Image Generating Apparatus>

Figure 3:
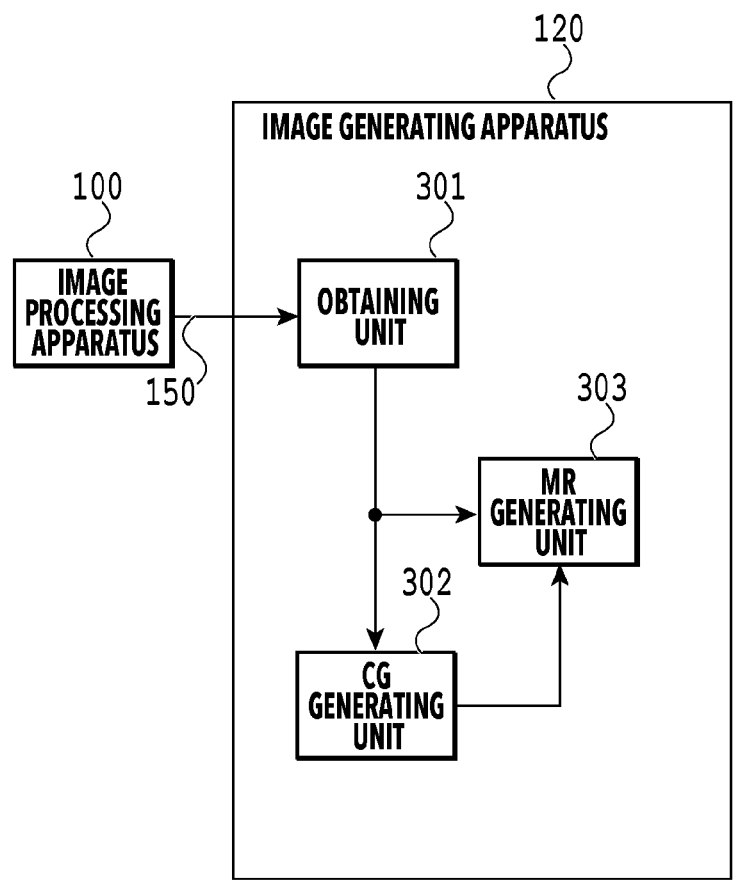
FIG. 3 is a block diagram showing an example of functional structures of an image generating apparatus according to the Embodiment 1.

The image generating apparatus 120 generates the high-quality MR still image corresponding to the frame of the MR moving image at the time of acceptance of the obtainment request by using the generation information outputted from the image processing apparatus 100. To be more precise, the image generating apparatus 120 performs re-rendering while using the rendering information and the intermediate data included in the generation information, thereby generating the high-quality CG corresponding to the CG superimposed on the frame of the MR moving image at the time of acceptance of the obtainment request. In addition, the image generating apparatus 120 generates the high-quality MR still image by superimposing the CG on the captured image while using the captured image data as well as the depth data included in the generation information and using the generated CG data. Functional structures of the image generating apparatus 120 will be described with reference to FIG. 3. FIG. 3 is a block diagram showing an example of the functional structures of the image generating apparatus 120 according to the Embodiment 1. As the functional structures, the image generating apparatus 120 includes an obtaining unit 301, a CG generating unit 302, and an MR generating unit 303.

The image generating apparatus 120 is formed from a computer such as a personal computer, a smartphone, and a tablet terminal. The respective units included in the image generating apparatus 120 as the functional structures is implemented by software that employs a processor such as the CPU and a GPU built in the image generating apparatus 120, and a memory such as the RAM. Here, the image generating apparatus 120 may be provided with one or more dedicated hardware units other than the processor, and at least part of the processing to be carried out by the processor may be executed by the dedicated hardware. Examples of the dedicated hardware include an ASIC, an FPGA, a DSP, and the like.

<Processing in Respective Functional Structures of Image Generating Apparatus>

The obtaining unit 301 obtains the generation information outputted from the image processing apparatus 100 through the communication line 150. The source of obtainment of the generation information is not limited to the image processing apparatus 100. The obtaining unit 301 may obtain the generation information by reading the generation information out of the storage device that stores the generation information in advance. The CG generating unit 302 generates the CG by carrying out re-rendering while using the intermediate data and the rendering information included in the generation information obtained by the obtaining unit 301. By carrying out the re-rendering while using the intermediate data, the CG generating unit 302 can generate the high-quality CG with a smaller amount of calculation.

The MR generating unit 303 generates the MR still image by superimposing the CG on the captured image while using the captured image data as well as the depth data included in the generation information obtained by the obtaining unit 301 and using the CG generated by the CG generating unit 302. In this way, the image generating apparatus 120 can generate the high-quality MR still image corresponding to the frame of the MR moving image at the time of acceptance of the obtainment request with a smaller amount of calculation.

<Operation of Image Processing Apparatus>

Figure 4:
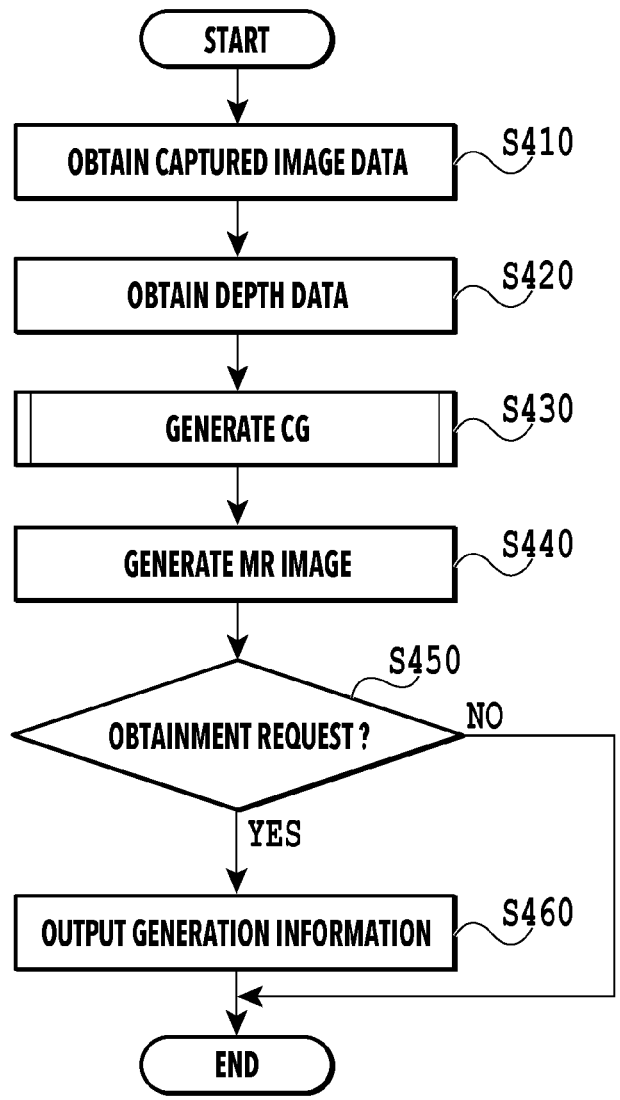
FIG. 4 is a flowchart showing an example of a processing flow by the image processing apparatus according to the Embodiment 1.

An operation of the image processing apparatus 100 will be described with reference to FIG. 4. FIG. 4 is a flowchart showing an example of a processing flow by the image processing apparatus 100 according to the Embodiment 1. The image processing apparatus 100 repeatedly executes the processing of this flowchart until the image processing apparatus 100 accepts an instruction to terminate display of the MR moving image on the display device, which is instructed by an operation by the user and the like, for example. First, the image obtaining unit 101 obtains the captured image data in S410. Next, the image obtaining unit 101 obtains the depth data in S420. Then, the CG generating unit 102 generates the CG in S430. Details of rendering processing in the case where the CG generating unit 102 generates the CG will be described later with reference to FIGS. 5 to 6F.

Next, in S440, the MR generating unit 103 generates the frames of the MR moving image by using the captured image data obtained in S410, the depth data obtained in S420, and the CG data generated in S430. For example, the MR generating unit 103 compares the depth data obtained in S420 with a depth of each pixel in the CG generated in S430, that is, information indicating a distance from the virtual viewpoint to a point in the virtual space corresponding to each pixel in the CG. To be more precise, the MR generating unit 103 compares the pixels of the captured image and the pixels of the CG to be superimposed on the aforementioned pixels on the pixel-by-pixel basis, for example, thus determining which one of the pixels is located closer to a position of the viewpoint of the user. In the case where the pixel of the CG is located closer to the position of the viewpoint of the user than the pixels of the captured image, the MR generating unit 103 generates each frame of the MR moving image by superimposing the pixel of the CG on the captured image.

Next, in S450, the accepting unit 104 determines whether or not the obtainment request is accepted. In the case where it is determined that the obtainment request is accepted in S450, the output unit 105 outputs the generation information in S460. In this instance, the output unit 105 may output the data of the frames of the MR moving image generated in S440 in addition to the generation information. Here, the output unit 105 may output the captured image data, the rendering information, the intermediate data, and the like included in the generation information in a lump. Alternatively, the output unit 105 may sequentially output the captured image data, the rendering information, the intermediate data, and the like in an arbitrary order. After S460 or in the case where it is determined that the obtainment request is not accepted in S450, the image processing apparatus 100 terminates the processing of the flowchart shown in FIG. 4. After the termination, the image processing apparatus 100 returns to the processing in S410, and repeatedly executes the processing of the flowchart until the image processing apparatus 100 accepts the instruction to terminate the display of the MR moving image on the display device, for example.

<Rendering Processing>

Figure 5:
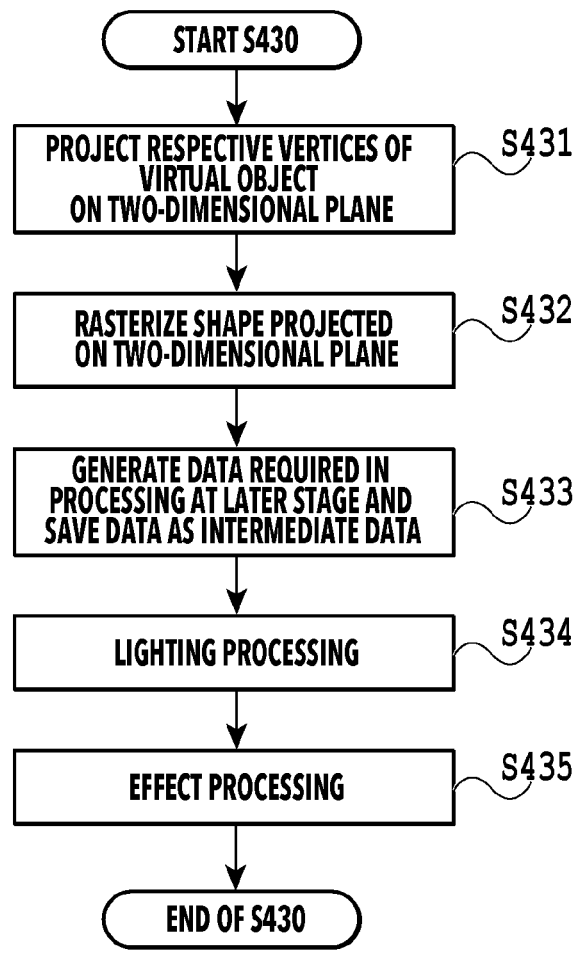
FIG. 5 is a flowchart showing an example of a processing flow by a CG generating unit provided to the image processing apparatus according to the Embodiment 1.

The rendering processing to be executed in S430 will be described with reference to FIGS. 5 to 6F. FIG. 5 is a flowchart showing an example of a processing flow of the rendering processing by the CG generating unit 102 provided to the image processing apparatus 100 according to the Embodiment 1. FIGS. 6A to 6F are explanatory diagrams for explaining the example of the rendering processing by the CG generating unit 102 provided to the image processing apparatus 100 according to the Embodiment 1. FIG. 6A shows a positional relationship between a virtual viewpoint 603 and a virtual object 601. First, in S431, the CG generating unit 102 projects respective vertices of the virtual object 601 expressed by the three-dimensional shape data of the polygon or the like onto a two-dimensional plane 602. FIG. 6B shows an appearance of the virtual object 601 viewed from the virtual viewpoint 603, which represents a region 604 surrounded by line segments that connect the vertices of the virtual object 601 projected on the two-dimensional plane 602 to one another. In other words, the region 604 is a region corresponding to the virtual object 601 projected on the two-dimensional plane 602.

Figure 6C:
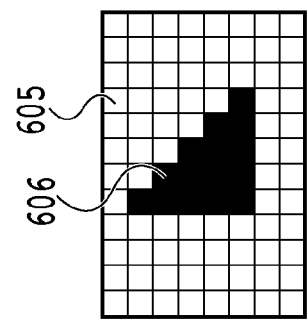
FIGS. 6A to 6F are explanatory diagrams for explaining the example of the processing by the CG generating unit provided to the image processing apparatus according to the Embodiment 1.
Figure 6F:
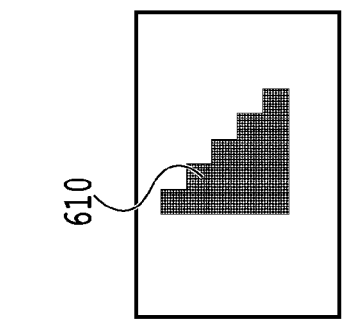
Figure 6B:
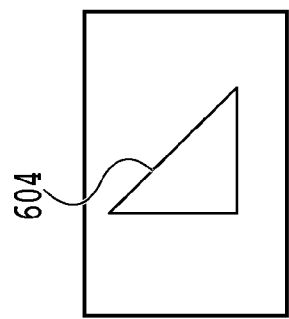

FIG. 6C shows an image region 606 corresponding to the region 604 in the case of converting the two-dimensional plane 602 into an image 605. After S431, the CG generating unit 102 rasterizes the shape projected on the two-dimensional plane 602, that is, the region 604 and obtains the image 605 including the image region 606 corresponding to the region 604 in S432. Note that each region expressed by using a rectangle in the image 605 represents a picture element (pixel) in the image 605 in FIG. 6. The image region 606 is expressed by a group of pixels.

Figure 6E:
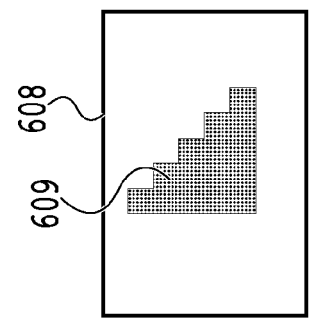
Figure 6A:
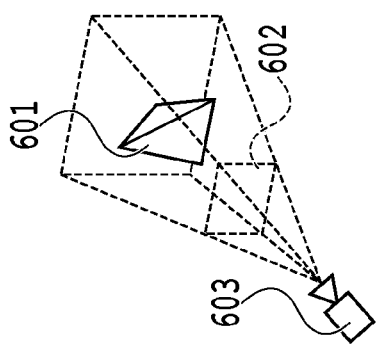
Figure 6D:
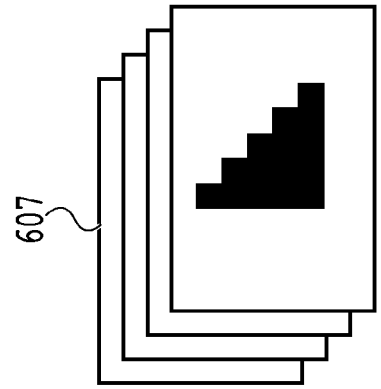

FIG. 6D shows a group of intermediate data 607. After S432, the CG generating unit 102 generates various data to be used in processing at a later stage, and saves part or all of the generated data as the intermediate data 607 in the RAM 203 and the like in S433. The processing at the later stage is the lighting processing on the virtual object 601, for example. The data required in the lighting processing includes the color information, the normal line information, and the CG coordinate information mentioned above. However, the required data is not limited to these pieces of information.

FIG. 6E shows an image 608 including an image region 609 corresponding to the virtual object 601 subjected to the lighting processing. After S433, the CG generating unit 102 carries out the lighting processing in S434 by using the data generated in S433. In the lighting processing, the CG generating unit 102 calculates shade components that appear on the virtual object 601 in the case where the virtual object 601 is irradiated with the light emitted from the light source, and generates the image 608 in consideration of effects of the light source. Details of the lighting processing will be described later.

FIG. 6F shows an image 610 after subjecting the image 608 to effect processing. After S434, the CG generating unit 102 conducts a variety of the effect processing in S435 as post-processes on the image 608 generated in S434, thereby generating the image 610 as the final CG corresponding to the virtual object 601. The effect processing is exposure processing to adjust brightness of the entire image depending on display contents, for example. However, the effect processing is not limited to this processing.

<Lighting Processing>

As an example of the lighting processing, the present embodiment will describe a mode of calculating intensities of two types of reflected light, namely, diffuse reflected light and specular reflected light. In the following description, the light source of the present embodiment is assumed to be directional lighting which is present at an infinite distance and has a constant light intensity irrespective of the distance from the light source. Although the present embodiment will describe the example in which the light source is the directional lighting and there are the two types of the reflected light as mentioned above, the mode of the lighting processing is not limited to this assumption.

Figure 7:
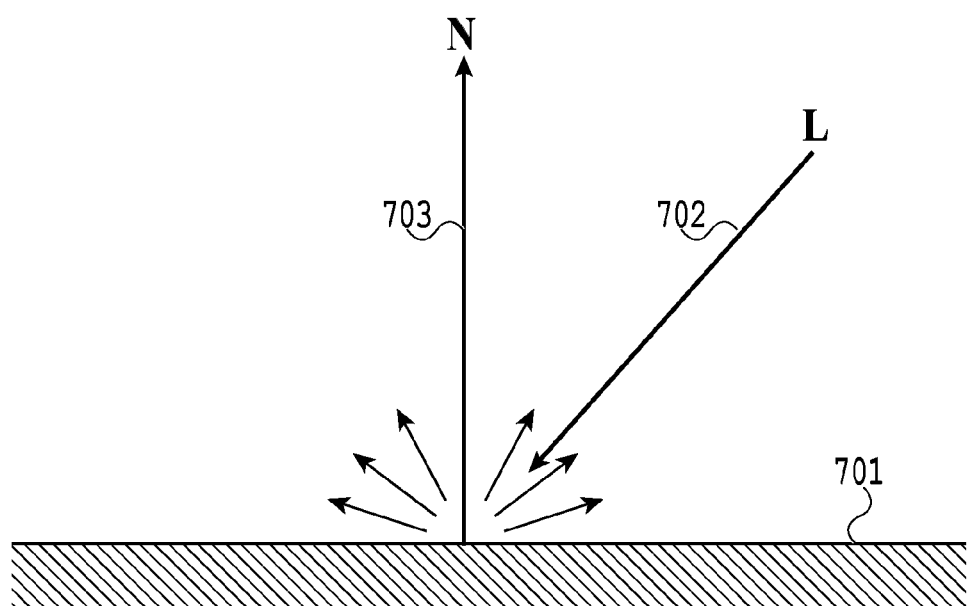
FIG. 7 is an explanatory diagram for explaining an example of a method of calculating diffuse reflected light.

Diffuse reflection is a form of reflection in which reflected light spreads in various directions at intensities that are substantially equal. A method of calculating the diffuse reflected light will be described with reference to FIG. 7. FIG. 7 is an explanatory diagram for explaining an example of a typical method of calculating the diffuse reflected light. A description will be given below of a case where a certain plane 701 is irradiated with the light from the directional lighting. A ray vector 702 indicates a traveling direction of irradiation light from the directional lighting. A normal line vector 703 indicates a direction of a normal line to the plane 701. In this instance, an intensity $I_d$ of the diffuse reflected light is calculated by using the following formula (1). Here, $k_d$ is diffuse reflectance, $I_i$ is an intensity of the irradiation light emitted from the light source, N is the normal line vector 703 to the plane 701, and L is the ray vector 702 of the irradiation light from the directional lighting:

$$I_d = k_d \cdot I_i \cdot (-N \cdot L) \quad \text{formula (1)}.$$

Figure 8:
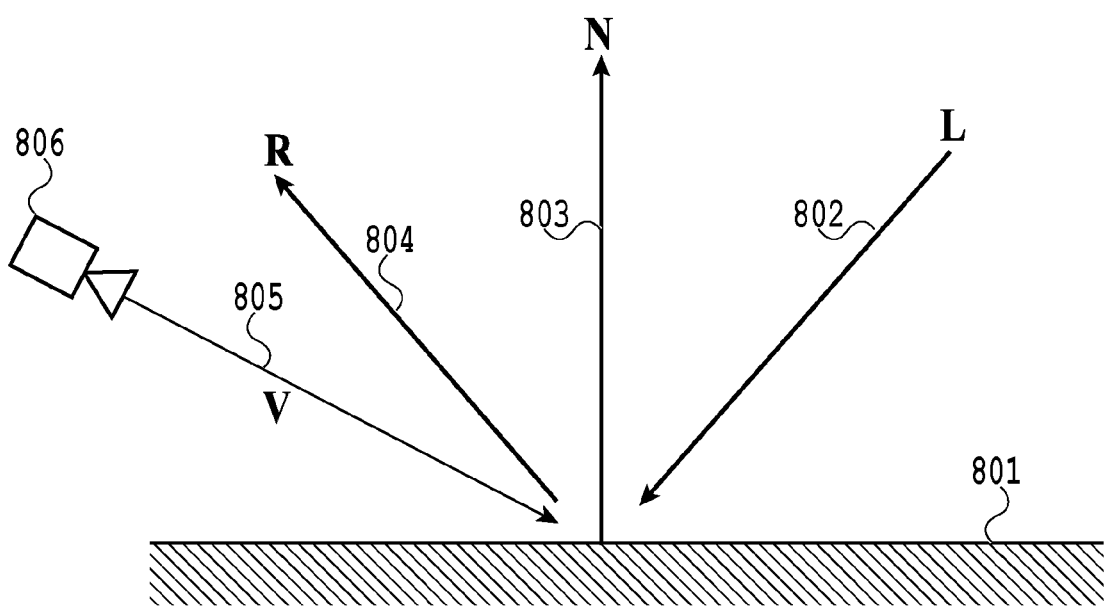
FIG. 8 is an explanatory diagram for explaining an example of a method of calculating specular reflected light.

Specular reflection is reflection that is also referred to as highlight, which represents strong reflection in a specular direction. A method of calculating the specular reflected light will be described with reference to FIG. 8. FIG. 8 is an explanatory diagram for explaining an example of a typical method of calculating the specular reflected light. A description will be given below of a case where a certain plane 801 is irradiated with the light from the directional lighting. A ray vector 802 indicates a traveling direction of the irradiation light from the directional lighting. A normal line vector 803 indicates a direction of a normal line to the plane 801. A ray vector 804 indicates a traveling direction of the specular reflected light of the light from the directional lighting. A viewpoint 806 indicates a position of a viewpoint and a line-of-sight vector 805 indicates a direction of a line-of-sight. In this instance, an intensity $I_s$ of the specular reflected light is calculated by using the following formula (2). Here, $k_s$ represents specular reflectance, $I_i$ represents the intensity of the irradiation light emitted from the light source, R represents the ray vector indicating the traveling direction of the specular reflected light being the irradiation light from the directional lighting that is specularly reflected from the plane 801, V represents the line-of-sight vector, and n represents a parameter to control the intensity of the specular reflection:

$$I_s = k_s \cdot I_i \cdot (-R \cdot V)^n \quad \text{formula (2)}.$$

Meanwhile, the reflected light vector R and the line-of-sight vector V can be calculated by using the following formulae (3) and (4). Here, N represents the normal line vector to the certain plane 801, L represents the ray vector of the irradiation light from the directional lighting, $(x_e, y_e, z_e)$ represent coordinates of the viewpoint, and $(x_s, y_s, z_s)$ represent coordinates of a point of incidence of the irradiation light from the directional lighting:

$$R = L + 2(-N \cdot L) \times N \quad \text{formula (3); and}$$

$$V = (x_s, y_s, z_s) - (x_e, y_e, z_e) \quad \text{formula (4)}.$$

The lighting processing is carried out by using the intensities of the two types of the reflected light by the diffuse reflection and the specular reflection. As a result, a pixel value $I_L$ is obtained by using the following formula (5). Here, $I_B$ indicates a value of a base color:

$$I_L = (I_d + I_s) \cdot I_B \quad \text{formula (5)}.$$

<Operation of Image Generating Apparatus>

Figure 9:
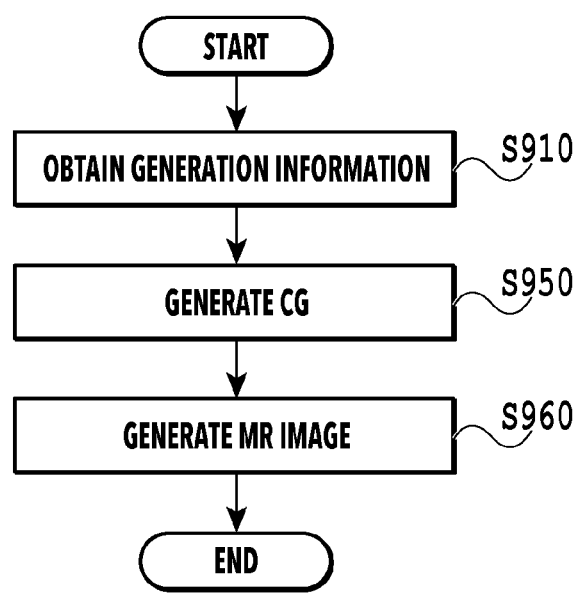
FIG. 9 is a flowchart showing an example of a processing flow by the image generating apparatus according to the Embodiment 1.

An operation of the image generating apparatus 120 will be described with reference to FIG. 9. FIG. 9 is a flowchart showing an example of a processing flow by the image generating apparatus 120 according to the Embodiment 1. The image generating apparatus 120 executes the processing of the flowchart shown in FIG. 9 in the case of presence of new generation information that has not been used yet, for example. First, the obtaining unit 301 obtains the generation information in S910. The present embodiment will be described on the assumption that the generation information includes light source information indicating the slanting angle of the light emitted from the light source, the intensity of this light, and the like collectively as the rendering information, and that the CG generating unit 302 generates the CG by using the generation information represented by these pieces of information. Note that the rendering conditions used for generating the CG are not limited to these conditions.

Next, in S950, the CG generating unit 302 generates the CG by using the intermediate data such as the color information, the normal line information, the reflection information, and the CG coordinate information included in the generation information obtained in S910, and the rendering information such as the viewpoint information and the light source information. To be more precise, the CG generating unit 302 first generates the CG by calculating the intensities of the two types of the reflected light of the diffuse reflected light and the specular reflected light as the lighting processing as with S434 by the CG generating unit 102, for example. The intensity of the diffused reflected light is calculated by using the diffuse reflectance indicated by the reflection information and the normal line information included in the intermediate data, and using the ray vector of the irradiation light based on the slanting angle of the light emitted from the light source indicated by the light source information as well as the intensity of the light emitted by the light source indicated by the light source information which are included in the rendering information. The intensity of the specular reflected light is calculated by using the reflected light vector obtained from the normal line information and the ray vector of the irradiation light, the line-of-sight vector obtained from the viewpoint information and the CG coordinate information, the specular reflectance, and the intensity of the light emitted from the light source. Moreover, the CG generating unit 302 generates the final CG by carrying out the lighting processing while using the above-mentioned intensities of the two types of the reflected light thus calculated, and the color information included in the intermediate data.

Next, in S960, the MR generating unit 303 generates the MR still image by superimposing the CG on the captured image by using the captured image data and the depth data included in the generation information obtained in S910, and the CG data generated in S950. After S960, the image generating apparatus 120 terminates the processing of the flowchart shown in FIG. 9. The image generating apparatus 120 can generate the high-quality CG with a smaller amount of calculation by rendering the CG while using the intermediate data at the time of acceptance of the obtainment request. As a consequence, the image generating apparatus 120 can generate the high-quality MR still image corresponding to the frame of the MR moving image at the time of acceptance of the obtainment request with a smaller amount of calculation.

Therefore, according to the image processing apparatus 100 configured as described above, it is possible to reduce the amount of calculation in the course of the generation processing of the MR still image while improving the quality of the MR still image at an arbitrary point of time.

As mentioned earlier, the rendering information may include the data of the shader code to be used as the rendering condition at the time of acceptance of the obtainment request. In the case where the data of the shader code is included in the rendering information, the CG generating unit 302 may carry out the lighting processing by using the shader code in addition to the intermediate data. The above-described configuration enables the CG generating unit 302 to carry out the lighting processing by using the same shader code as that used by the CG generating unit 102. As a consequence, the MR generating unit 303 can generate the MR still image, which has high quality as well as less feeling of strangeness relative to the frame of the MR moving image generated by the MR generating unit 103, with a smaller amount of calculation.

The description has been given in the Embodiment 1 on the assumption that the rendering information to be outputted as the generation information also includes the light source information used by the CG generating unit 102 in the lighting processing in addition to the viewpoint information. However, the present disclosure is not limited to this configuration. For example, the rendering information to be outputted as the generation information does not have to include the information other than the viewpoint information as typified by the light source information. In the case where the rendering information to be outputted as the generation information does not include the light source information, the CG generating unit 302 may generate the CG by carrying out the lighting processing by using the light source information prepared in advance, for example.

Meanwhile, the CG generating unit 302 may generate the light source information from an object that appears in the captured image and a shadow of the object by using the captured image data or by using the captured image data and the depth data included in the generation information, for example, and may carry out the lighting processing by using the generated light source information. Alternatively, the CG generating unit 302 may carry out the lighting processing by using the light source information which is set by the user through the operating unit 206, for example. Here, the light source information is the information indicating the slanting angle of the light emitted from the light source, the intensity of this light, and the like. However, the light source information is not limited to these pieces of information. As a consequence of the above-described configuration, the CG generating unit 302 can generate the CG by carrying out the lighting processing under different conditions from those used in the case where the CG generating unit 102 generates the CG.

The description has been given in the Embodiment 1 on the assumption that the image processing apparatus 100 obtains the depth data and further outputs the depth data as the generation information. However, the image processing apparatus 100 does not always have to obtain the depth data or the depth data does not always have to be included in the generation information. In the case where the image processing apparatus 100 does not obtain the depth data, the MR generating unit 103 may generate the frame of the MR moving image in accordance with a method of superimposing the CG on all the pixels of the captured image, for example. Alternatively, in the case where the depth data is not included in the generation information obtained by the image generating apparatus 120, the MR generating unit 303 may generate the MR still image in accordance with the method of superimposing the CG on all the pixels of the captured image, and the like. Here, the method of superimposing the CG on all the pixels of the captured image is a mere example, and the processing to be carried out in the absence of the depth data is not limited to this method.

The Embodiment 1 has described the aspect in which the CG generating unit 302 generates the final CG by carrying out the lighting processing in S950. However, the processing in S950 is not limited to this configuration. For example, in S950, the CG generating unit 302 may carry out post-processing such as the processing carried out in S435 in addition to the lighting processing. In this case, the CG generating unit 302 may carry out the post-processing by using the intermediate data included in the generation information.

In the Embodiment 1, the output unit 105 outputs the generation information in S460. However, the timing to output the generation information is not limited to this configuration. For example, the output unit 105 may preserve the generation information on the memory such as the RAM 203 in S460. Thereafter, the output unit 105 may output the generation information preserved on the memory in a case where there is leeway to perform extra processing such as in a case where the processing to generate the frame of the MR moving image is no longer necessary as a consequence of accepting the instruction to terminate display of the MR moving image on the display device.

The Embodiment 1 has described the configuration to provide the image processing apparatus 100 and the image generating apparatus 120 as different apparatuses from each other. However, the present disclosure is not limited to this configuration. For example, in addition to the image obtaining unit 101, the CG generating unit 102, the MR generating unit 103, the accepting unit 104, and the output unit 105, the image processing apparatus 100 may further include the obtaining unit 301, the CG generating unit 302, and the MR generating unit 303 which are originally provided to the image generating apparatus 120.

A scope of application of the image processing apparatus 100 is not limited to the HMD. For example, the image processing apparatus 100 is also applicable to a smartphone, a tablet terminal, and the like. In the case of applying the image processing apparatus 100 to the smartphone, for example, the image capturing apparatus 110 is located on an opposite surface to a display surface of the smartphone. Moreover, in this case, the image processing apparatus 100 displays the generated MR moving image on the display surface of the smart phone.

Embodiment 2

An image processing apparatus 100 according to Embodiment 2 (hereinafter simply referred to as the image processing apparatus 100) will be described with reference to FIGS. 1 to 3, 10, and 11. The image processing apparatus 100 according to the Embodiment 1 is configured to output the captured image data as the generation information. Meanwhile, the image generating apparatus 120 according to the Embodiment 1 is configured to generate the MR still image by superimposing the CG on the captured image while using the captured image data included in the generation information.

On the other hand, the image processing apparatus 100 according to the Embodiment 2 also obtains RAW data corresponding to the captured image data in addition to the captured image data, and outputs the RAW data as the generation information instead of the captured image data. Moreover, using the RAW data included in the generation information, the image generating apparatus 120 according to the Embodiment 2 generates the MR still image by superimposing the CG on an image obtaining by developing the RAW data (hereinafter referred to as a developed image) while using the RAW data included in the generation information. This makes it possible to generate the MR still image at higher quality.

<Configuration of Image Processing Apparatus>

The image processing apparatus 100 includes the respective units shown as the examples in FIG. 1 as with the image processing apparatus 100 according to the Embodiment 1. The processing of the respective units included in the image processing apparatus 100 is carried out by the hardware such as the ASIC and the FPGA built in the image processing apparatus 100 as with the image processing apparatus 100 according to the Embodiment 1. The processing may be carried out by the software using the memory such as the RAM 203 and the processor such as the CPU 201 shown as the examples in FIG. 2. Moreover, the image processing apparatus 100 is applied to the image processing system 1 shown as the example in FIG. 1 as with the image processing apparatus 100 according to the Embodiment 1.

<Processing in Respective Functional Structures of Image Processing Apparatus>

A description will be given of processing of the respective units included in the image processing apparatus 100 as the functional structures thereof. Note that the CG generating unit 102, the MR generating unit 103, and the accepting unit 104 included in the image processing apparatus 100 are the same as the respective units included in the image processing apparatus 100 according to the Embodiment 1, and detailed explanations thereof will be omitted in the following description. The image obtaining unit 101 obtains the captured image data and the RAW data corresponding to the captured image data. To be more precise, the image obtaining unit 101 obtains the captured image data and the RAW data outputted from the image capturing apparatus 110. The source of obtainment of the captured image data and the RAW data is not limited to the image capturing apparatus 110. For example, the image obtaining unit 101 may obtain the captured image data or the RAW data by reading out at least any of the captured image data and the RAW data from a storage device not illustrated in FIG. 1. In this case, the image capturing apparatus 110 outputs the captured image data or the RAW data to the storage device and causes the storage device to store the captured image data or the RAW data in advance, for example. The image obtaining unit 101 may obtain the depth data in addition to the captured image data and the RAW data. In the following description, the image obtaining unit 101 is assumed to obtain the depth data as well in addition to the captured image data and the RAW data.

The output unit 105 outputs the generation information to be used for generating the MR still image, which corresponds to the frame of the MR moving image at the time of acceptance of the obtainment request, by re-rendering the CG. The generation information includes the RAW data that corresponds to the captured image data used for generating the frame of the MR moving image at the time of acceptance of the obtainment request. In the case where the image obtaining unit 101 obtains the depth data, the output unit 105 may include the depth data in the generation information to be outputted. Meanwhile, the output unit 105 outputs the rendering information to be used in the processing to generate the CG at the time of acceptance of the obtainment request, and the intermediate data generated in the course of the processing to generate the CG at the time of acceptance of the obtainment request collectively as the generation information. The details of the rendering information and the intermediate data have already been described above and explanations thereof will be omitted.

Here, the rendering information at least includes the viewpoint information. In addition to the viewpoint information, the rendering information may include at least any of the light source information at the time of acceptance of the obtainment request, and the data of the shader code to be used as the rendering condition at the time of acceptance of the obtainment request. The output unit 105 outputs the generation information to the image generating apparatus 120 through the communication line 150. The output destination of the generation information is not limited to the image generating apparatus 120. The output unit 105 may output the generation information to the auxiliary storage device 204 or a storage device not illustrated in FIG. 1, or the like, and may cause any of these devices to store the outputted generation information.

<Configuration of Image Generating Apparatus>

The image generating apparatus 120 includes the respective units shown as the examples in FIG. 3 as with the image generating apparatus 120 according to the Embodiment 1. The image generating apparatus 120 is formed from a computer as with the image generating apparatus 120 according to the Embodiment 1. The respective units included in the image generating apparatus 120 as the functional structures is implemented by software that employs a processor such as the CPU and the GPU built in the image generating apparatus 120, and a memory such as the RAM. Here, the image generating apparatus 120 may be provided with one or more dedicated hardware units other than the processor, and at least part of the processing to be carried out by the processor may be executed by the dedicated hardware.

<Processing in Respective Functional Structures of Image Generating Apparatus>

A description will be given of processing of the respective units included in the image generating apparatus 120 as the functional structures thereof. Note that the obtaining unit 301 and the CG generating unit 302 included in the image generating apparatus 120 are the same as the respective units included in the image generating apparatus 120 according to the Embodiment 1, and detailed explanations thereof will be omitted in the following description. The MR generating unit 303 generates the MR still image by using the RAW data included in the generation information obtained by the obtaining unit 301 and the CG data generated by the CG generating unit 302. The MR still image to be generated by the MR generating unit 303 is the high-quality MR still image corresponding to the frame of the MR moving image at the time of acceptance of the obtainment request.

To be more precise, the MR generating unit 303 first develops the RAW data and obtains the developed image corresponding to the RAW data. Here, parameters used for development are stored in advance in a storage device not illustrated in FIG. 3, for example, and the MR generating unit 303 obtains the parameters used for development by reading the relevant parameters out of the storage device. The parameters used for development are not limited to those stored in the storage device. For example, the parameters may be set by an input operation by the user. Next, the MR generating unit 303 generates the MR still image by superimposing the CG generated by the CG generating unit 302 on the developed image. In the case where the generation information includes the depth data, the MR generating unit 303 may superimpose the CG on the developed image by using the depth data.

According to the above-described configuration, the image generating apparatus 120 can generate the high-quality CG with a smaller amount of calculation by carrying out rendering while using the intermediate data. Thus, the image generating apparatus 120 can generate the high-quality MR still image with a smaller amount of calculation.

<Operation of Image Processing Apparatus>

Figure 10:
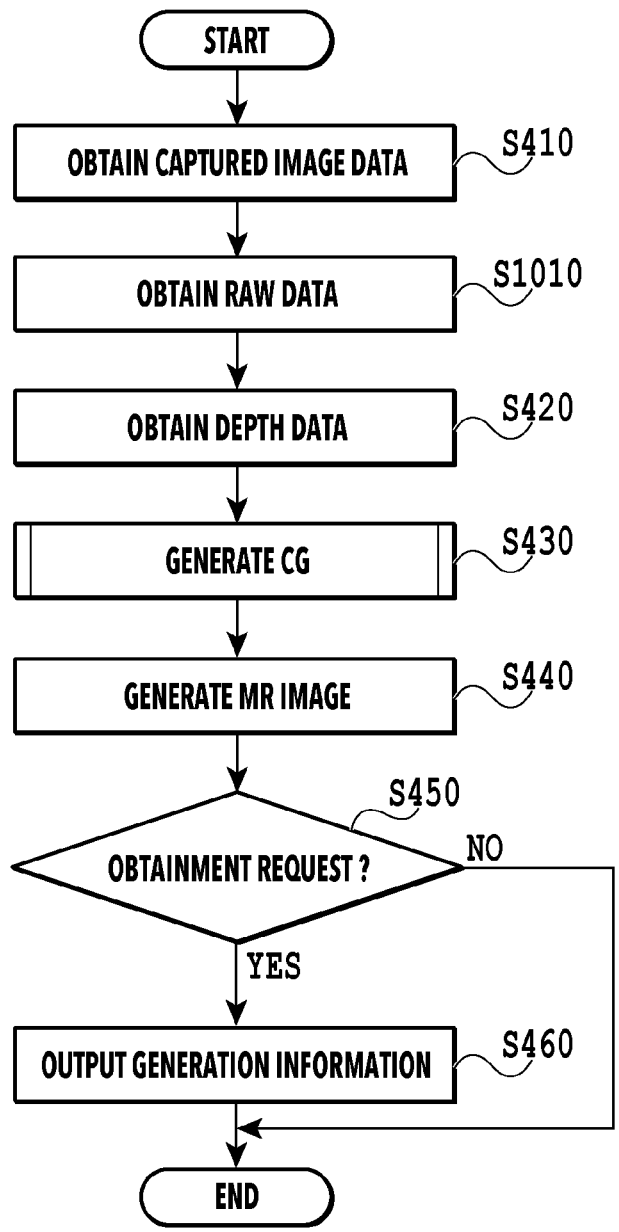
FIG. 10 is a flowchart showing an example of a processing flow by an image processing apparatus according to Embodiment 2.

An operation of the image processing apparatus 100 will be described with reference to FIG. 10. FIG. 10 is a flowchart showing an example of a processing flow by the image processing apparatus 100 according to the Embodiment 2. The image processing apparatus 100 repeatedly executes the processing of this flowchart until the image processing apparatus 100 accepts an instruction to terminate display of the MR moving image on the display device, which is instructed by an operation by the user and the like, for example. In the following description, the same processing as that to be executed by the image processing apparatus 100 according to the Embodiment 1 will be denoted by the same reference signs as those in FIG. 4 and explanations thereof will be omitted.

First, the image processing apparatus 100 executes the processing in S410. After S410, the image obtaining unit 101 obtains the RAW data in S1010, which corresponds to the captured image data obtained in S410. After S1010, the image processing apparatus 100 executes the processing from S420 to S460. Here, the generation information to be outputted from the output unit in S460 does not include the captured image data, but includes the RAW data corresponding to the captured image data instead. After S460 or in the case where it is determined that the obtainment request is not accepted in S450, the image processing apparatus 100 terminates the processing of the flowchart shown in FIG. 10. After the termination, the image processing apparatus 100 returns to the processing in S410, and repeatedly executes the processing of the flowchart until the image processing apparatus 100 accepts the instruction to terminate the display of the MR moving image on the display device, for example.

<Operation of Image Generating Apparatus>

Figure 11:
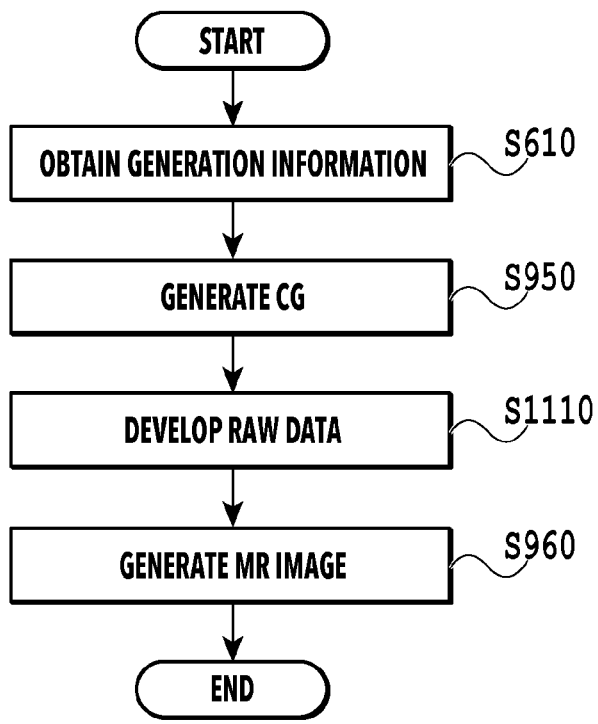
FIG. 11 is a flowchart showing an example of a processing flow by an image generating apparatus according to the Embodiment 2.

An operation of the image generating apparatus 120 will be described with reference to FIG. 11. FIG. 11 is a flowchart showing an example of a processing flow by the image generating apparatus 120 according to the Embodiment 2. The image generating apparatus 120 executes the processing of the flowchart shown in FIG. 11 in the case of presence of new generation information that has not been used yet, for example. In the following description, the same processing as that to be executed by the image generating apparatus 120 according to the Embodiment 1 will be denoted by the same reference signs as those in FIG. 9 and explanations thereof will be omitted.

First, the image generating apparatus 120 executes the processing in S910 and S950. Note that the generation information to be obtained by the obtaining unit 301 in S910 includes the RAW data. After S950, the MR generating unit 303 develops the RAW data included in the generation information and obtains the data of the developed image in S1110. In S1120 subsequent to S1110, the MR generating unit 303 generates the MR still image by superimposing the CG on the developed image while using the depth data included in the generation information obtained in S910, the CG data generated in S950, and the data of the developed image obtained in S1110.

After S1110, the image generating apparatus 120 terminates the processing of the flowchart shown in FIG. 11. The image generating apparatus 120 can generate the high-quality CG with a smaller amount of calculation by rendering the CG while using the intermediate data at the time of acceptance of the obtainment request. As a consequence, the image generating apparatus 120 can generate the high-quality MR still image corresponding to the frame of the MR moving image at the time of acceptance of the obtainment request with a smaller amount of calculation. Moreover, the image generating apparatus 120 generates the MR still image corresponding to this frame by using the RAW data corresponding to the captured image data used for generating the frame of the MR moving image at the time of acceptance of the obtainment request. Thus, the image generating apparatus 120 can generate the MR still image at higher quality as compared to the case of using the captured image data.

Therefore, according to the image processing apparatus 100 configured as described above, it is possible to reduce the amount of calculation in the course of the generation processing of the MR still image while improving the quality of the MR still image at an arbitrary point of time. Moreover, according to the image processing apparatus 100, it is possible to further improve the quality of the MR still image by outputting the RAW data as the generation information.

The description has been given in the Embodiment 2 on the assumption that the image processing apparatus 100 outputs the RAW data corresponding to the captured image data instead of the captured image data. However, the image processing apparatus 100 may output both the RAW data and the captured image data as the generation information.

The Embodiment 2 has described the configuration to provide the image processing apparatus 100 and the image generating apparatus 120 as different apparatuses from each other. However, the present disclosure is not limited to this configuration. For example, in addition to the image obtaining unit 101, the CG generating unit 102, the MR generating unit 103, the accepting unit 104, and the output unit 105, the image processing apparatus 100 may further include the obtaining unit 301, the CG generating unit 302, and the MR generating unit 303 which are originally provided to the image generating apparatus 120.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to reduce am amount of calculation in the course of generation processing of an MR still image while improving quality of the MR still image at an arbitrary point of time.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-097342, filed Jun. 16, 2022, which is hereby incorporated by reference wherein in its entirety.

What is claimed is:

1. An image processing apparatus comprising:
one or more hardware processors; and
one or more memories storing one or more programs configured to be executed by the one or more hardware processors, the one or more programs including instructions for:
obtaining data of a captured image;
generating computer graphics corresponding to an appearance of a virtual object disposed in a virtual space from a virtual viewpoint;
generating a moving image by superimposing the computer graphics on the captured image;
accepting an obtainment request of data of a still image corresponding to a frame of the moving image; and
outputting generation information to be used in a case of generating the still image, wherein
the generation information includes
the data of the captured image at time of acceptance of the obtainment request, and
intermediate data to be generated in a case of generating the computer graphics, the intermediate data being present at the time of acceptance of the obtainment request, and
the intermediate data is information used in lighting processing in the case of generating the computer graphics.

2. The image processing apparatus according to claim 1, wherein
the intermediate data includes at least any of
information indicating a color of each of one or more elements constituting the virtual object,
information indicating a distance of each of the one or more elements from the virtual viewpoint, and
information indicating reflection of each of the one or more elements.

3. The image processing apparatus according to claim 1, wherein
in a case where the virtual object is formed from one or more polygons, the intermediate data includes at least any of
information indicating a color of each of the one or more polygons constituting the virtual object,
information indicating a distance of each of the one or more polygons from the virtual viewpoint,
information indicating reflection of each of the one or more polygons, and
information indicating an orientation of each of the one or more polygons.

4. The image processing apparatus according to claim 1, wherein the one or more programs further include an instruction for:
causing a display device to display the moving image, wherein
the display device is the display device of a head mounted type, and
the moving image is displayed on the display device of the head mounted type.

5. The image processing apparatus according to claim 1, wherein
data of the frame of the moving image at the time of acceptance of the obtainment request is outputted in addition to the generation information.

6. The image processing apparatus according to claim 1, wherein
the generated computer graphics is generated based on rendering information indicating a rendering condition, and
the rendering information includes at least viewpoint information indicating a position of the virtual viewpoint, and
in addition to the viewpoint information, the rendering information includes at least any of
data of a shader code to be used as the rendering condition at the time of acceptance of the obtainment request, and
light source information to be used as the rendering condition at the time of acceptance of the obtainment request.

7. The image processing apparatus according to claim 1, wherein
depth data indicating a depth of a space corresponding to at least part of an image capturing range in the captured image is further obtained,
the moving image is generated by using the obtained data of the captured image, the obtained depth data, and data of the generated computer graphics, and the depth data is further outputted as the generation information.

8. The image processing apparatus according to claim 1, wherein
RAW data corresponding to the data of the captured image is further obtained, and
the RAW data at the time of acceptance of the obtainment request is outputted as the generation information instead of the data of the captured image.

9. The image processing apparatus according to claim 1, wherein
first computer graphics is generated,
the moving image is generated, and
the one or more programs further include instructions for:
obtaining the outputted generation information;
generating second computer graphics being different from the first computer graphics by carrying out the lighting processing by using the intermediate data included in the obtained generation information; and
generating the still image by superimposing the second computer graphics on the captured image by using the data of the captured image included in the obtained generation information and using data of the generated second computer graphics.

10. The image processing apparatus according to claim 9, wherein
depth data indicating a depth of a space corresponding to at least part of an image capturing range in the captured image is further obtained,
the depth data at the time of acceptance of the obtainment request is further outputted as the generation information, and
the still image is generated by using the data of the captured image and the depth data included in the obtained generation information and using the data of the second computer graphics.

11. The image processing apparatus according to claim 9,
RAW data corresponding to the data of the captured image is further obtained,
the RAW data at the time of acceptance of the obtainment request is outputted as the generation information instead of the data of the captured image, and
the still image is generated by superimposing the second computer graphics on an image obtained by developing the RAW data included in the obtained generation information instead of the data of the captured image.

12. The image processing apparatus according to claim 9, wherein
the second computer graphics is generated by further carrying out post-processing by using the intermediate data included in the obtained generation information.

13. An image processing method comprising the step of:
obtaining data of a captured image;
generating computer graphics corresponding to an appearance of a virtual object disposed in a virtual space from a virtual viewpoint;
generating a moving image by superimposing the computer graphics on the captured image;
accepting an obtainment request of data of a still image corresponding to a frame of the moving image; and
outputting generation information to be used in a case of generating the still image, wherein
the generation information includes
the data of the captured image at time of acceptance of the obtainment request, and
intermediate data to be generated in a case of generating the computer graphics, the intermediate data being present at the time of acceptance of the obtainment request, and
the intermediate data is information used in lighting processing in the case of generating the computer graphics.

14. A non-transitory computer readable storage medium storing a program for causing a computer to perform a control method of an image processing apparatus, the control method comprising the steps of
obtaining data of a captured image;
generating computer graphics corresponding to an appearance of a virtual object disposed in a virtual space from a virtual viewpoint;
generating a moving image by superimposing the computer graphics on the captured image;
accepting an obtainment request of data of a still image corresponding to a frame of the moving image; and
outputting generation information to be used in a case of generating the still image, wherein
the generation information includes
the data of the captured image at time of acceptance of the obtainment request, and
intermediate data to be generated in a case of generating the computer graphics, the intermediate data being present at the time of acceptance of the obtainment request, and
the intermediate data is information used in lighting processing in the case of generating the computer graphics.

* * * * *